Sept. 1, 1925.
F. H. STANWOOD
RUBBER TREAD
Filed June 11, 1923
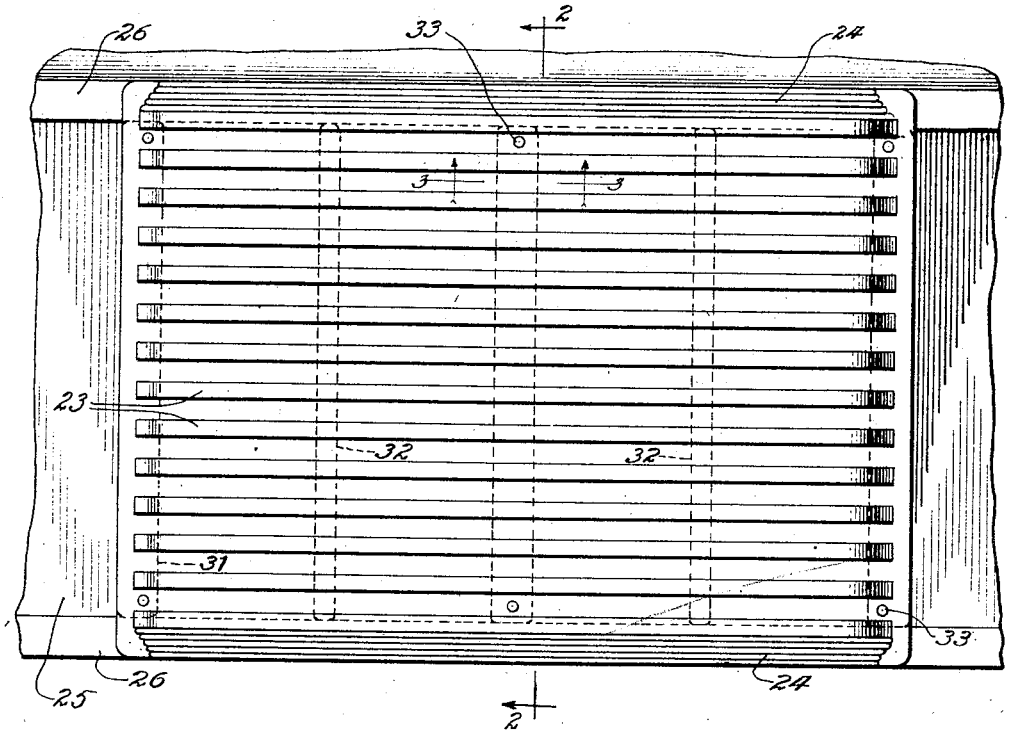
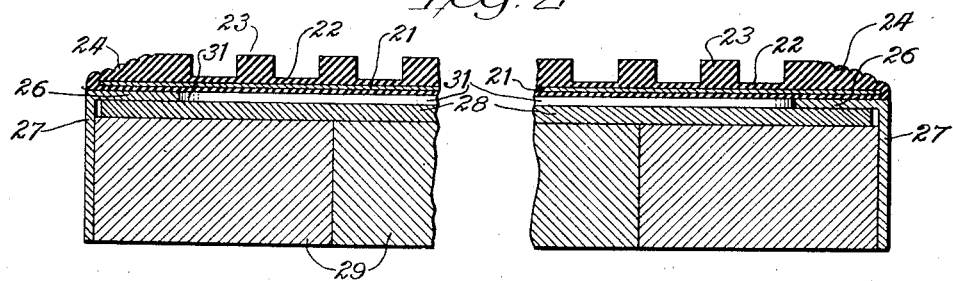
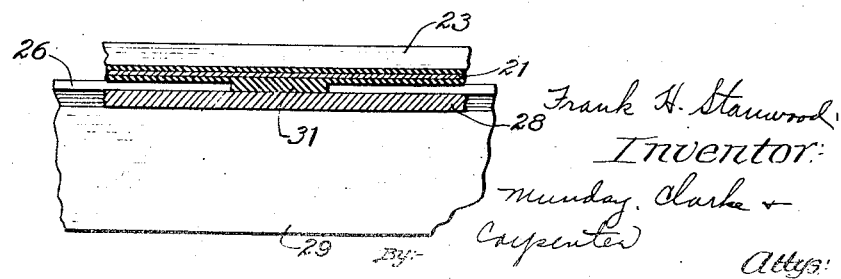
Frank H. Stanwood,
Inventor.
Munday, Clarke & Carpenter
Attys.

Patented Sept. 1, 1925.

1,552,241

UNITED STATES PATENT OFFICE.

FRANK H. STANWOOD, OF WILMETTE, ILLINOIS, ASSIGNOR TO STANWOOD EQUIPMENT COMPANY, OF CHICAGO, ILLINOIS, A CORPORATION OF MAINE.

RUBBER TREAD.

Application filed June 11, 1923. Serial No. 644,585.

*To all whom it may concern:*

Be it known that I, FRANK H. STANWOOD, a citizen of the United States, residing in Wilmette, in the county of Cook and State of Illinois, have invented a new and useful Improvement in Rubber Treads, of which the following is a specification.

My present invention relates to step plates, or non-slipping treads, of the general type shown in my prior Patents Nos. 1,257,144 and 1,409,125, and has more particular reference to the provision of means on such a tread to support it upon an automobile running board in such manner as to cause it to cover the binding strip, or edge plate normally provided on said running board.

A further object of the invention is the provision of an automobile running board step plate provided with supporting parts, or strips, on the bottom thereof, which are formed by merely molding the rubber covering of the metal insert shown in my prior patents in such manner as to provide said supporting parts, or strips, this being manifestly an economical operation which does not add materially to the cost of the tread.

Other objects and advantages of the invention will be apparent as it is better understood from the following description, which, taken in connection with the accompanying drawings, discloses a preferred embodiment thereof.

Referring to the drawings,

Figure 1 is a plan view of a step tread embodying my invention, the same being shown in position upon an automobile running board;

Fig. 2 is a partial transverse section, taken substantially on the line 2—2 in Fig. 1; and Fig. 3 is a partial longitudinal section taken substantially on the line 3—3 in Fig. 1.

As thus illustrated, the step plate of my invention comprises a metal plate 21 enclosed in a rubber covering 22, which preferably is vulcanized thereto, in accordance with my Patent #1,257,144 above referred to. On the upper surface of said covering, there are provided spaced ribs 23 and beyond the edge ribs are corrugated nosings 24, substantially as shown in my Patent #1,409,125. The general construction of the step plate, it is believed, need not be further described, since it is fully set forth in my earlier patents and does not form an essential part of this invention.

The running board, which is generally indicated at 25, is of the usual form in which binding strips 26 are provided at the front and rear edges, these forming, in the present instance, a part of angle members 27 secured to the front and rear edges of the running board and extending over a surface board 28 resting upon the body members 29 of said board. As clearly shown in Fig. 2, the strips 26, which are of metal, are elevated a considerable distance above the surface of the surface board 28, and, in accordance with the present invention, I provide strip parts 31 on the under side of the tread, which are of approximately the same thickness as the metal strips 26, whereby the tread is supported at the surface level of said strips and adapted to extend thereover. In the present instance, I have shown relatively wide strip parts 31 at the opposite ends and in the center of the tread and narrower parts 32 intermediate said parts 31. The length of these strip parts, it will be observed, is such that they fit between the binding strip 26 with the edges of the step tread extending sufficiently beyond the ends of the strip parts to fully cover said binding strips.

With the construction just described, the metal strips which form a slippery surface are covered at the point where they are likely to be engaged by the foot and danger of slipping is thus prevented. The tread is also firmly supported, so that it will not lose its shape in service. It may, of course, be held in desired position in any suitable manner, as by rivets 33 provided at suitable points at opposite sides of the running board.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A step tread for automobiles and the like, comprising a plate having non-slipping elements thereon and having edge portions adapted to extend over edge strips of a running board, and means on the under side of said plate for supporting the latter at the level of said edge strips.

2. A step tread for automobiles and the like, comprising a plate having non-slipping elements on the upper surface thereof, and means on the under surface for supporting said plate at the level of an edge strip on the running board, said plate having a part adapted to overlie said strip.

3. A step tread for automobiles and the like, comprising a rigid plate having a covering thereon providing a non-slipping surface on the upper side, and means on the under side adapted to support the tread at the level of an edge strip on the running board, said tread having a part adapted to overlie said strip.

4. A step tread for automobiles and the like, comprising a metal plate having a rubber covering vulcanized thereto and providing a non-slipping surface on the upper side, and means on the under side adapted to support the tread at the level of an edge strip on the running board, said tread having a part adapted to overlie said strip.

5. A step tread for automobiles and the like, comprising a metal plate, and a unitary rubber covering about said plate, said covering being formed with non-slipping upper surface elements and supporting elements on the under side of substantially the thickness of a running board binding strip, said elements being adapted to be disposed inwardly of said strip with the edge of the tread extending over the strip and preventing slipping on the latter.

6. A step tread for automobiles and the like, comprising a non-slipping plate adapted to be positioned upon a running board having an edge binding strip thereon, said plate having means thereon for supporting it at the level of the binding strip whereby it may overlie the latter.

FRANK H. STANWOOD